(12) United States Patent
Cooley et al.

(10) Patent No.: US 6,432,056 B1
(45) Date of Patent: Aug. 13, 2002

(54) ULTRASONIC DIAGNOSTIC IMAGING SYSTEM WITH HIGH FRAME RATE SYNTHETIC TRANSMIT FOCUS

(75) Inventors: Clifford R. Cooley, Seattle; Thomas J Sabourin, Mill Creek; Brent Stephen Robinson, Kirkland, all of WA (US)

(73) Assignee: ATL Ultrasound, Bothell, WA (US)

( * ) Notice: Subject to any disclaimer, the term of this patent is extended or adjusted under 35 U.S.C. 154(b) by 0 days.

(21) Appl. No.: 09/415,958

(22) Filed: Oct. 8, 1999

(51) Int. Cl.[7] .................................................. A61B 8/00
(52) U.S. Cl. ....................................... 600/443; 600/447
(58) Field of Search .................................. 600/443, 442, 600/448, 449, 458, 444, 407

(56) References Cited

U.S. PATENT DOCUMENTS

| 4,305,296 | A |   | 12/1981 | Green et al. |   |
|---|---|---|---|---|---|
| 5,113,706 | A |   | 5/1992 | Pittaro |   |
| 5,142,649 | A |   | 8/1992 | O'Donnell |   |
| 5,235,982 | A |   | 8/1993 | O'Donnell |   |
| 5,318,033 | A |   | 6/1994 | Savord |   |
| 5,390,674 | A |   | 2/1995 | Robinson et al. |   |
| 5,568,813 | A |   | 10/1996 | Deitrich et al. |   |
| 5,579,770 | A |   | 12/1996 | Finger |   |
| 5,623,928 | A |   | 4/1997 | Wright et al. |   |
| 5,891,038 | A |   | 4/1999 | Seyed-Bolorforosh et al. |   |
| 5,902,243 | A |   | 5/1999 | Holley et al. |   |
| 5,924,986 | A | * | 7/1999 | Chandler et al. | 600/407 |
| 6,056,693 | A |   | 5/2000 | Haider |   |
| 6,102,863 | A | * | 8/2000 | Pflugrath et al. | 600/447 |
| 6,139,501 | A | * | 10/2000 | Roundhill et al. | 600/443 |

FOREIGN PATENT DOCUMENTS

WO    WO 99/30617    6/1999

OTHER PUBLICATIONS

U.S. application No. 08/993,395, Napolitano et al.
U.S. application No. 08/993,533, Cole et al.

* cited by examiner

Primary Examiner—Marvin M. Lateef
Assistant Examiner—Maulin Patel
(74) Attorney, Agent, or Firm—W. Brinton Yorks, Jr.

(57) ABSTRACT

An ultrasonic diagnostic imaging system is provided which produces scanlines with synthesized transmit foci at a high frame rate of display. Beams are transmitted and received which have different beam steering and focal characteristics. At least one of the received beams is weighted and the steering and focal characteristics of the weighted received beams are interpolated to form scanlines for display which exhibit the focal properties of both beams.

47 Claims, 8 Drawing Sheets

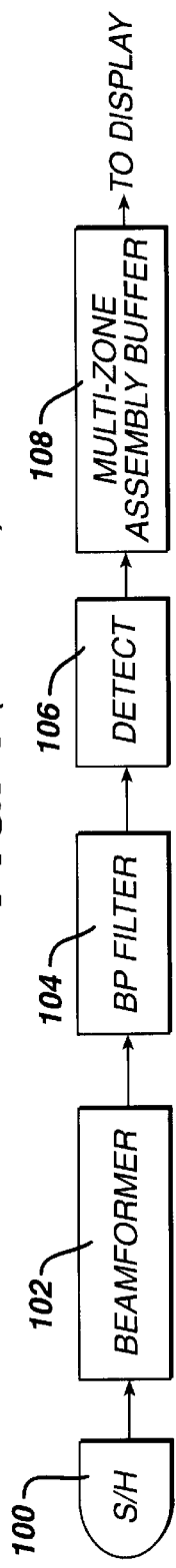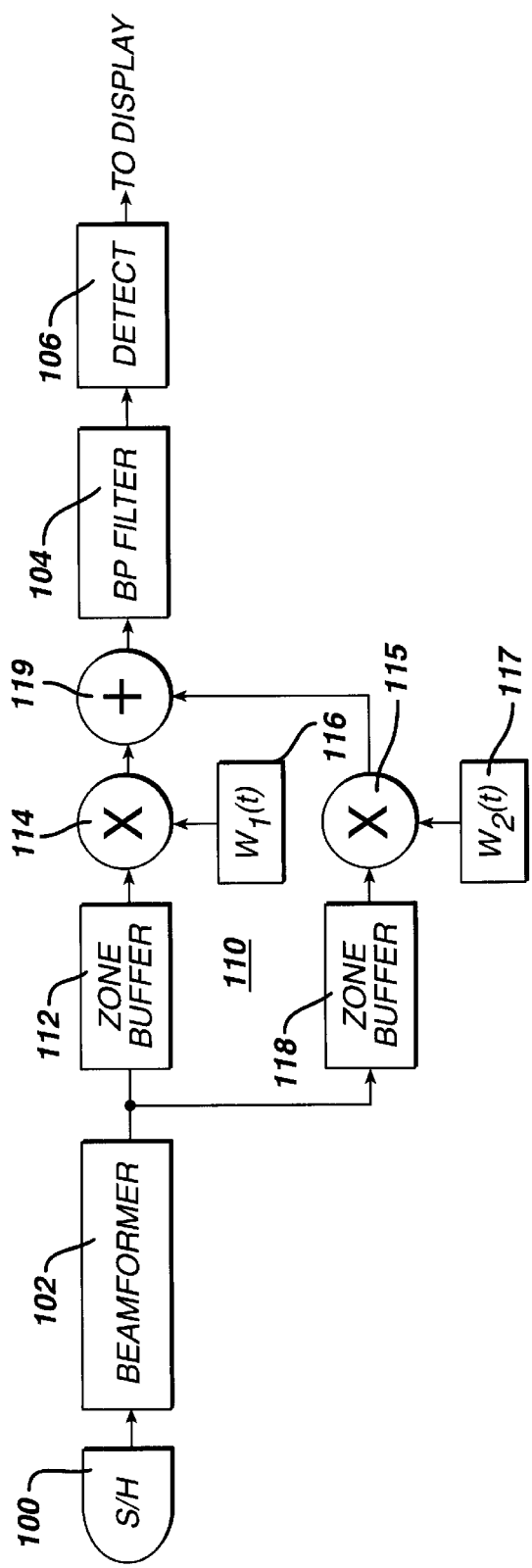

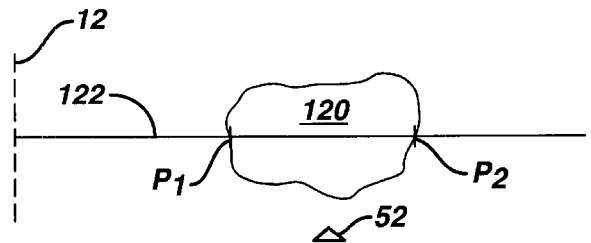
FIG. 11a
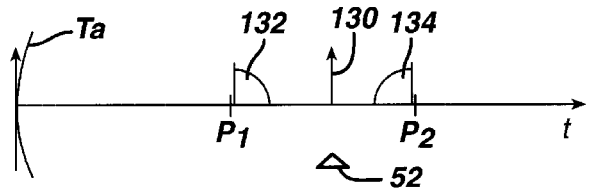
FIG. 11b
FIG. 12
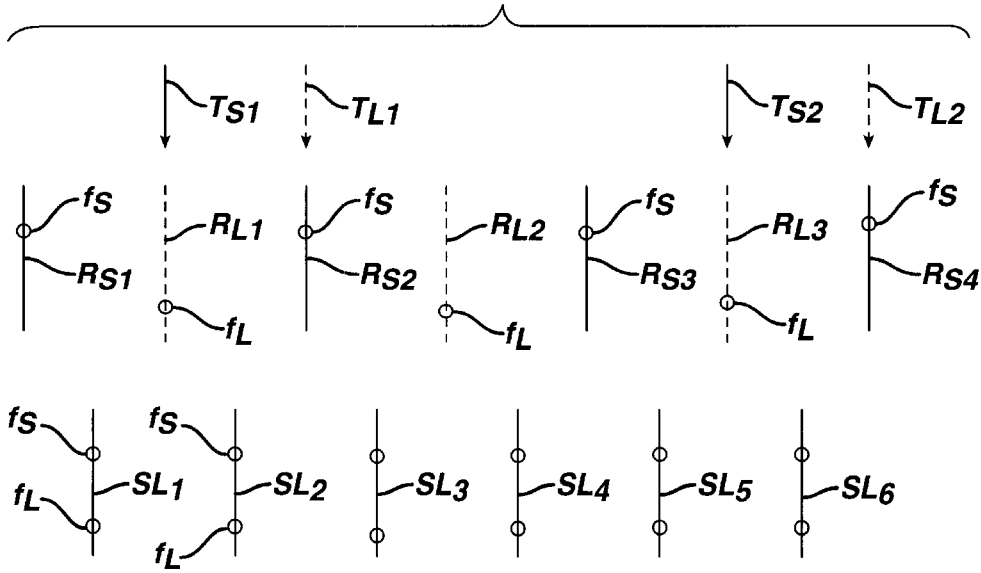

ULTRASONIC DIAGNOSTIC IMAGING SYSTEM WITH HIGH FRAME RATE SYNTHETIC TRANSMIT FOCUS

This invention relates to ultrasonic diagnostic imaging systems and, in particular, to ultrasonic diagnostic imaging systems which produce synthetic transmit focus scanlines at a high rate of acquisition.

Conventional ultrasonic diagnostic imaging systems utilize dynamic focus during beam formation to dynamically vary the focal range of received ultrasonic echoes as the echoes are received. This capability is made possible by the ability to continually change the delays applied to echoes received from different elements of a transducer array as the echoes are received, thereby continually changing the focal range of the transducer array's receive aperture. The effective curvature of the receive aperture is constantly made more gradual to progressively focus the transducer array at increasing ranges as echoes are received from ever-increasing depths following a transmit wave.

Such a dynamic focus capability is not possible during transmit, however. A transmitted beam can be focused at only one range by selectively delaying the application of transmit pulses across the aperture, with elements at the center of the array transducer experiencing delayed excitation in relation to elements located toward the lateral extremes of the transmit aperture. Once the transmit wave has been launched, it is not possible for the ultrasound system to modify or adjust its focus. Various techniques have been tried to effect a focal region at different or more extended depths such as focusing different elements of the array at different depths, combining multiple transmit pulses in a single transmission, encoding different frequency components to focus at different depths, and lateral deconvolution. All of these techniques have met with mixed success, complexity and/or compromise.

A conventional technique for dealing with the single focal characteristic of the transmit beam is what is known as multi-zone focus. In multi-zone focus each beam location is interrogated multiple times, with each transmission focused at a different transmit depth. During reception echoes are received around the focal range of each unique transmit beam, thereby acquiring segments of a complete receive scanline from different depth ranges. The segments are then spliced together to form a complete scanline for an image. A problem which is inherent in multi-zone focusing is the time required to scan an image field and produce an image, since each scanline must be interrogated multiple times in order to form a single scanline. It would be desirable to be able to improve the transmit focal characteristics of an ultrasound system but without the need to greatly reduce the frame rate of display.

In accordance with the principles of the present invention, received ultrasound signals with differing transmit steering directions and focal characteristics are processed to synthesize the characteristics of an extended transmit focal zone. In a preferred embodiment the processing is done on coherent echo signals received by multiline reception by varying the signal delay, weighting, or both, then combining the signals to form scanlines with extended focal characteristics. A preferred embodiment combines both lateral and focal interpolation to produce image lines at a high frame rate of display. The technique of the present invention can also be applied to a single focus scanline to improve spatial accuracy.

In the drawings:

FIG. 1 illustrates in block diagram form an ultrasound system of the prior art which performs multi-zone focusing;

FIG. 2 illustrates in block diagram form a first embodiment of an ultrasound system constructed in accordance with the principles of the present invention;

Figure 10:
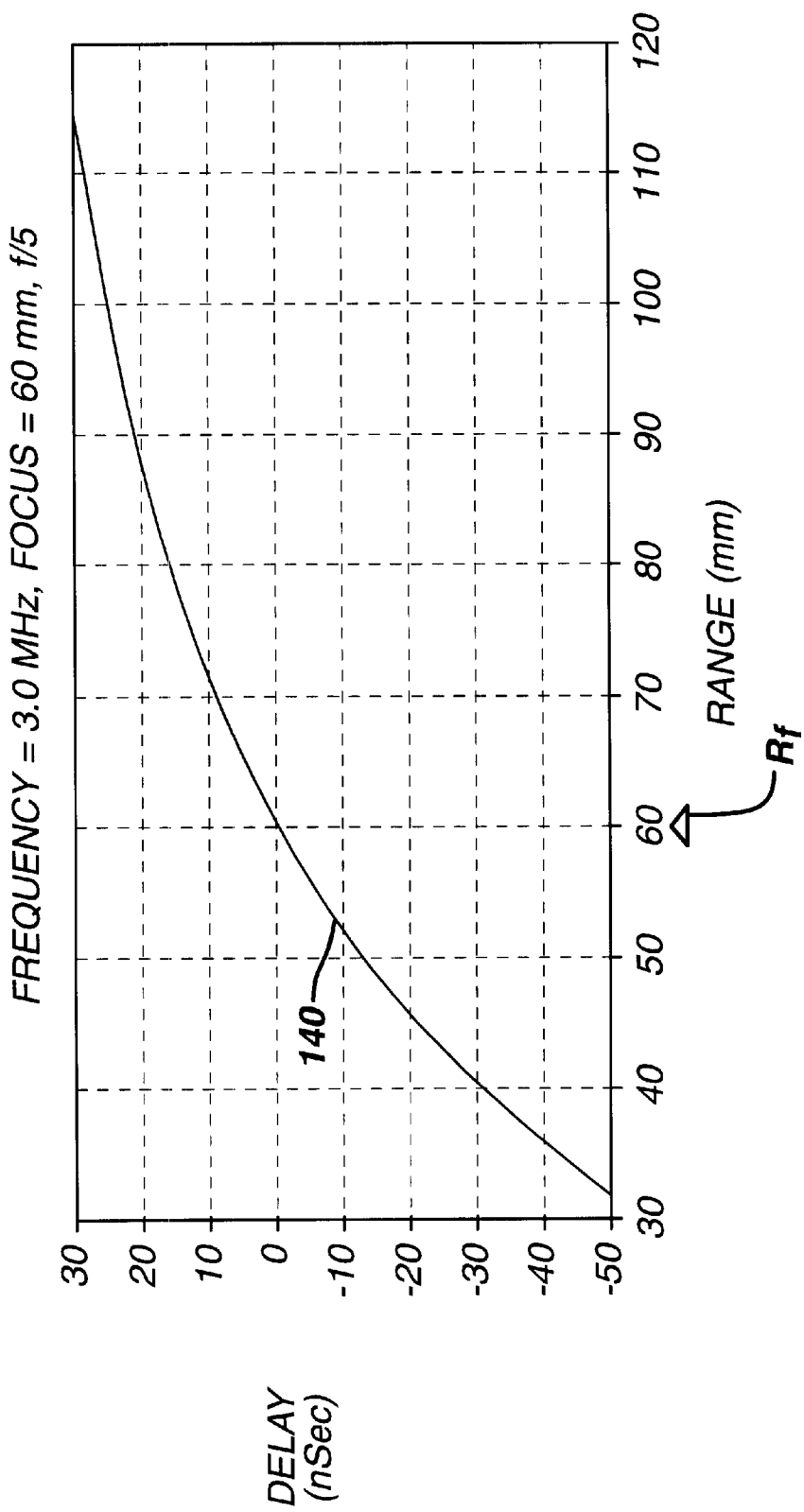
Figure 13:
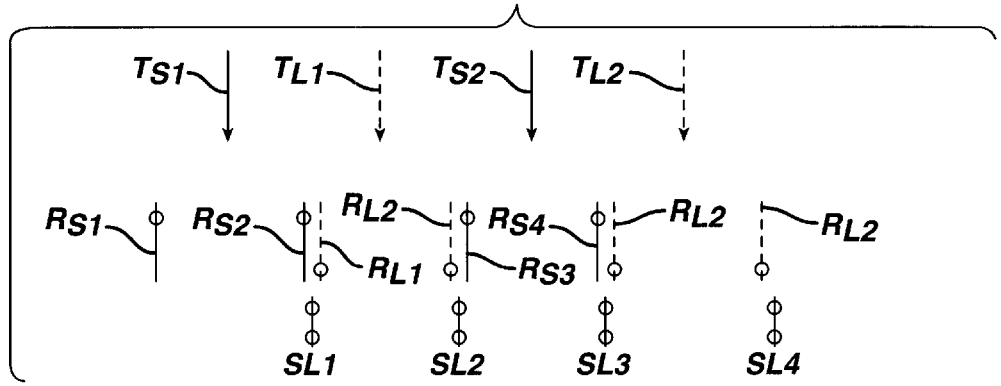
Figure 14A:
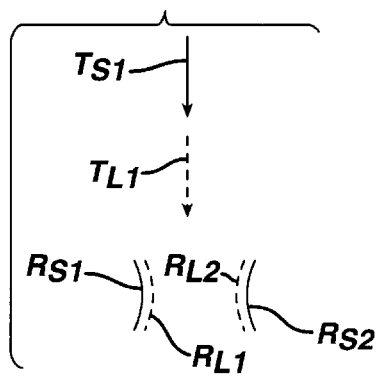
Figure 15A:
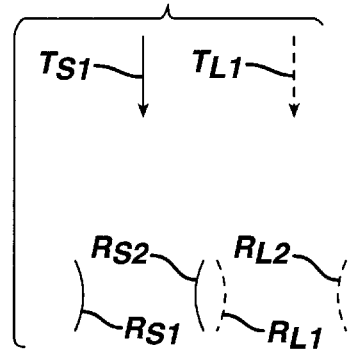
Figure 14B:
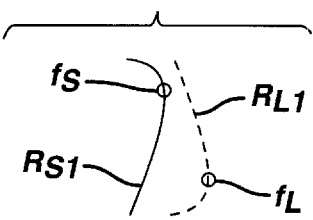
Figure 15B:
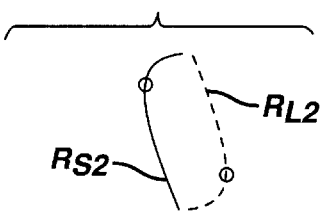
Figure 16:
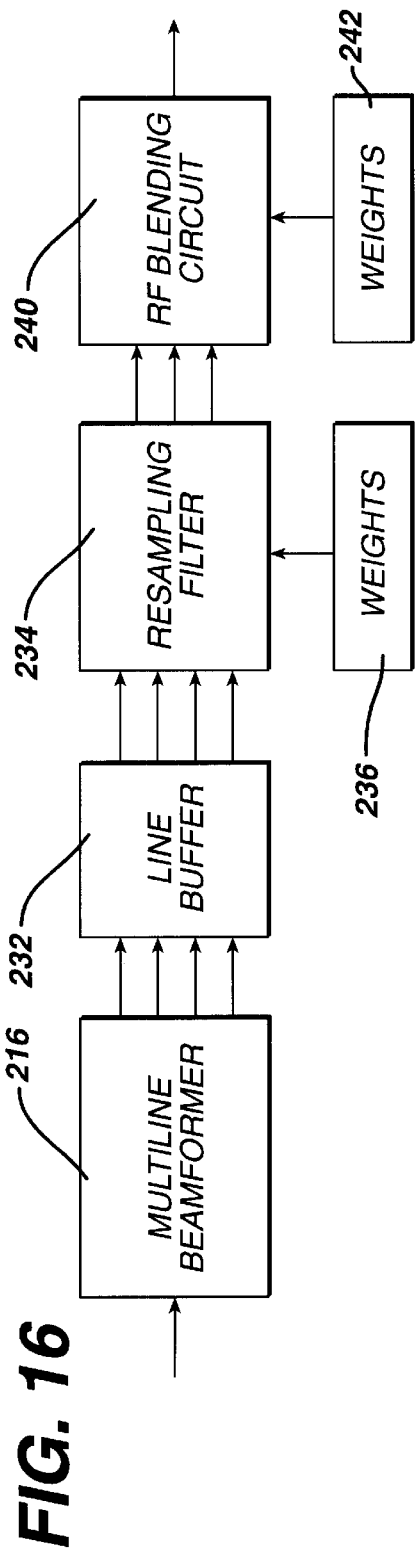
Figure 17:
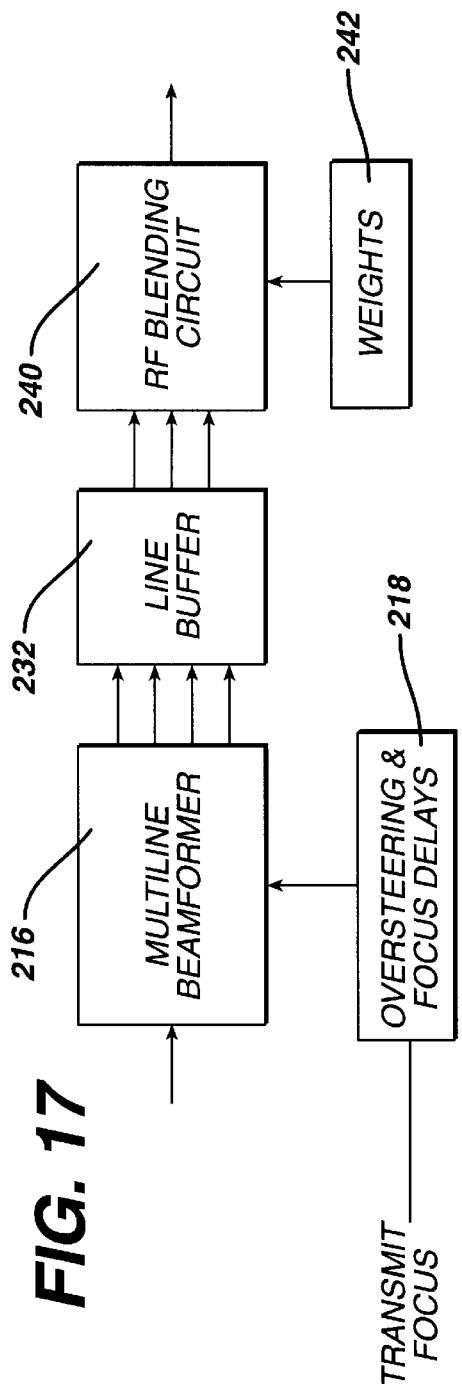

FIGS. 8a, 8b, 9a, and 9b illustrate delay adjustments used to combine two differently focused beams in accordance with the principles of the present invention;

FIG. 10 illustrates a plot of delay variation along a scanline in accordance with the principles of the present invention;

FIGS. 11a and 11b illustrate an embodiment of the present invention which operates on the echo data of a single scanline to improve diagnostic accuracy;

FIG. 12 illustrates a first embodiment of the present invention in which both steering and focal characteristics are interpolated to produce image scanlines with extended focal ranges;

FIG. 13 illustrates a second embodiment of the present invention in which both steering and focal characteristics are interpolated to produce image scanlines with extended focal ranges;

FIGS. 14a, 14b, 15a and 15b illustrate the effects of line registration artifacts when both steering and focal characteristics are interpolated; and FIGS. 16 and 17 illustrate multiline embodiments of the present invention which correct for spatial misregistration.

Our U.S. Pat. No. 5,390,674 teaches that ultrasound lines located at positions intermediate to acquired lines can be synthesized by laterally interpolating signals from the acquired line positions. This technique is valid when the acquired line positions are close enough together to satisfy the Nyquist sampling criteria, appropriate interpolation weights are used, and the signals are combined coherently. Under these conditions the synthesized data closely approximate the echo data that would be acquired if the beamformer steering delays were adjusted to form actual lines at the intermediate positions. It follows that amplitude interpolation of the echo data can, within the constraints mentioned above, give substantially the same results as actually altering beamformer steering delays.

The present invention extends this principle to transmit focal delays. More specifically ultrasound data at an intermediate transmit focal depth is synthesized by coherently combining signals acquired using transmit foci at adjacent depths. Just as in the lateral case, this technique is most effective when the adjacent foci are in close enough proximity to satisfy the sampling criteria and the data are appropriately weighted prior to combination. In the case of the present invention, amplitude interpolation is used to synthesize the effect of altering focal delays rather than steering delays.

More specifically, the signal returned from each transmit focus is regarded as a sample in an interpolation process. For uniform sampling the locations of the acquired and synthesized samples are not uniform in focal depth per se. Rather, they are uniform in a parameter related to the focal depth by a monotonic function. For example, in the region where the paraxial approximation holds, the function exhibits an inverse relation with focal depths.

In a constructed embodiment of the present invention, uniform sampling has several advantages. Firstly, the required number of samples is minimized. Secondly, the interpolation weights can be chosen by a simple algorithm, namely sub-sampling of the prototype filter. In the context of this invention, uniform sampling is preferably achieved by positioning the transmit foci so that the samples are spaced by equal steps of focal delay. The transmit foci are close enough together to support interpolation without aliasing when the maximum focal delays in the transmit aperture change by less than $1/F_S$ from one transmit focus to the next transmit focus (where $F_S$ is the minimum frequency capable of sampling the ultrasound signal adequately in time).

Referring first to FIG. 1, a typical prior art multi-zone ultrasound system is depicted in block diagram form. A scanhead 100 transmits and receives two or more beams in a given beam direction, each with a different transmit focus. The received echo signals are coherently combined by a beamformer 102 to form receive beam signals which are filtered by a bandpass filer 104, detected by a detector 106, and stored in a multi-zone assembly buffer 108. The assembly buffer separates out a segment of each received beam around its unique focal point and splices the segments together to form a scanline for the given beam direction. The resultant multi-zone focused scanline therefore exhibits optimal focal characteristics at the locations of the multiple focal points of the spliced beam segments as illustrated by FIG. 4.

Referring now to FIG. 2, an ultrasound system comprising a first embodiment of the present invention is shown in block diagram form. Two or more beams are once again transmitted with different focal characteristics and the received echoes coherently formed by the beamformer 102. The embodiment of FIG. 2 depicts a two-transmit beam configuration, however the principles of the present invention can be applied to three or more transmit beams with different transmit focal points. The coherent echo signals of the two received beams are processed and combined by an FIR interpolation filter 110. The coherent echo signals of the first received beam are temporarily stored in a zone buffer 112. The coherent echo signals of the second received beam are processed by a fine delay 118. Since the two received beams have different transmit focal characteristics, the echoes of the two beams will not be exactly locationally aligned in the range (depth) dimension. The fine delay 118 imparts a small time delay or advance to echoes of the second beam so that the positions of the corresponding echoes along each beam will exhibit corresponding locational alignment. While no delay or a fixed delay has been found to be satisfactory for some applications, the preferred time delay is time varying with echo depth as discussed more fully below.

The locationally corresponding echoes of the first and second received beams are then amplitude weighted by two time varying weighting functions $W_1(t)$ and $W_2(t)$. Weighting coefficients of the two weighting functions are stored in coefficient memories 116 and 117 and are used to weight the echo signal samples by multipliers 114 and 115. Preferably the weighting functions are inversely related to the focal depths of the respective beams. The weighted echo samples are then coherently combined by a summing circuit 119 to form a coherent scanline with the extended focal properties of a synthetic transmit focused scanline. The scanline signals are bandpass filtered, detected and displayed in an ultrasound image.

Figure 3:
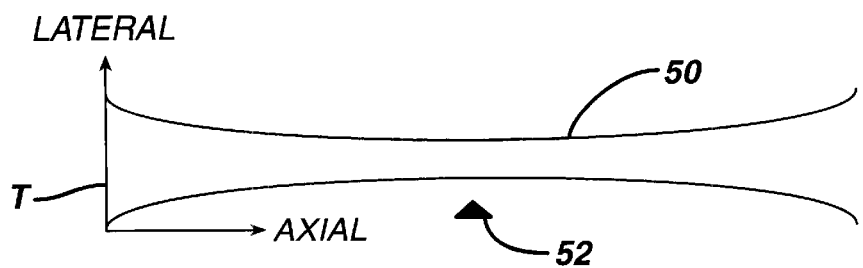
FIG. 3 illustrates a conventional ultrasonic beam characteristic with a single focal zone.
Figure 4:
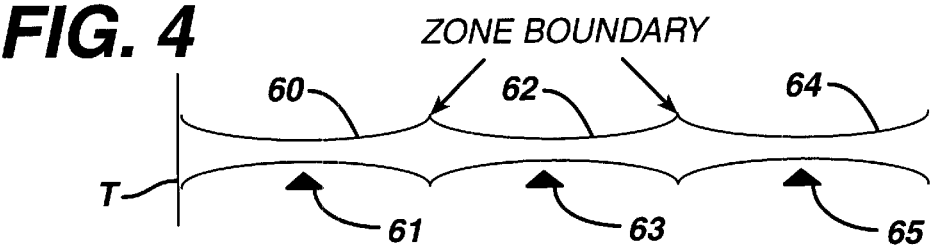
FIG. 4 illustrates a conventional multi-zone focus scanline.
Figure 5:
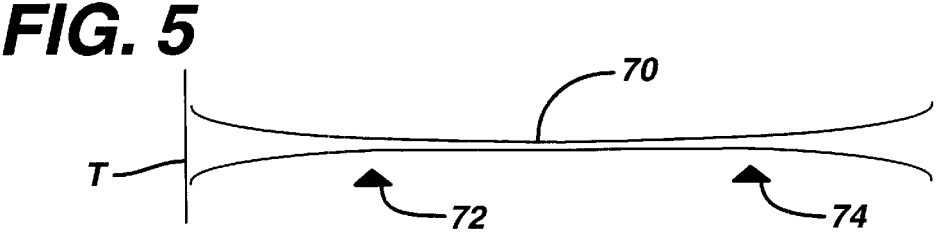
FIG. 5 illustrates the extended focal characteristic of a scanline processed in accordance with the principles of the present invention.

The operation and effect of an embodiment of the present invention can be appreciated by referring to FIGS. 3–5. FIG. 3 illustrates a focused beam pattern 50 transmitted by an array transducer located at position T in the drawing. The beam pattern is seen to narrow to a relatively narrow focus located about the focal point 52 at or near the geometric focal point as indicated by the small triangle. As is well known, the location of the focal point 52 is determined by the size and spacing of the elements of the active transmit aperture and the delays applied to the signals used to excite each transducer element of the active transmit aperture. A transmit beam 50 may be acceptable when the clinician is only interested in viewing a target located at or around the axial range of the focal point 52. The resultant image will exhibit its best focus in the vicinity of the focal point 52, and less optimal focus at depths which are increasingly shallower than or deeper than the focal point 52.

An image with improved focus can be produced by the multi-zone focusing arrangement of FIG. 1 which produces a result as illustrated in FIG. 4. In this example of multi-zone focusing, three transmit beams are used. The beam segment nearest to the array transducer T has a beam pattern 60 with a focal point 61, an intermediate range beam segment has a beam pattern 62 with a focal point 63, and the most distant range beam segment has a beam pattern 64 with a focal point 65. Each beam segment results from a separate transmit event, with the transmit focal characteristics (active transmit aperture, delays) optimized for each event for the specific transmit focal point and beam characteristic over a given short range which is less than the full range of the beam of FIG. 3.

Scanline segments received from each of the three transmit focal zones of FIG. 4 are spliced together to form a single scanline over the depth of field of the three segments. Several techniques are known for splicing the received segments together. U.S. Pat. No. 4,305,296, for example, assembles a full scanline by connecting the segments from the three zones end-to-end, referred to as the "butt-fit" approach. However, this approach can result in banding in the image where the image changes from one zone to another, due to gain or focal characteristic differences between the two zones or other zone-to-zone differences. The conventional approach to this problem is to acquire segments which overlap at the ends, indicated as the "zone boundary" in FIG. 3, so that the image can be faded from one zone to the next, known as the cross-fade approach. Cross-fading at the zone boundaries is shown in U.S. Pat. Nos. 5,568,813 and 5,579,770, for example.

An idealized beam characteristic resulting from practice of the present invention is shown in FIG. 5. This beam characteristic results from combining the echo signals of two scanlines, one having a shallow focal point 72 and the other having a deeper focal point 74. When the echo signals are processed and combined in accordance with the principles of the present invention an improved focal characteristic is produced over a substantial portion of the depth of the scanlines, as if a dynamic transmit focus were used. The focal characteristic improvement can be appreciated by comparing the beam characteristic of FIG. 5 with those of FIGS. 3 and 4.

Figure 6A:
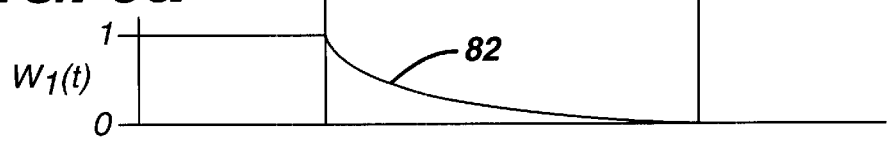
FIGS. 6a and 6b illustrate weighting characteristics used to combine two differently focused beams in accordance with the principles of the present invention.
Figure 6B:
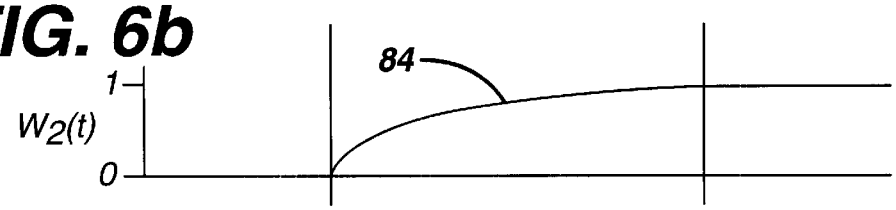

There are several aspects of the present invention which make possible such improvement. One is that the two scanlines are not simply butt-fit segments or segments cross-faded at the zone boundary as in the prior art. Instead, echoes over a substantial portion of the scanlines are processed and combined. Preferably echoes are combined over at least half of the distance (depth) from one focal point to the next. The characteristic shown in FIG. 5 results from the processing and combining of echo signals over the full distance from focal point 72 to focal point 74. Suitable weighting functions for use in processing the scanlines for the beam characteristic of FIG. 5 are shown in FIGS. 6a and 6b in spatial correspondence with FIG. 5. The first weighting function $W_1(t)$ for the shallow focused scanline is shown to have a normalized value of 1 from the transducer T to the focal point 72 of the shallow focused scanline. From the focal point 72 to the focal point 74 of the deeper focused scanline the $W_1(t)$ weighting function is seen to decline with an approximately inverse (1/range) function 82. While other functions including a linear response may be used between the focal points, the inverse (1/R) function is preferred as it more closely approximates the interpolation weights required to synthesize the transmit focus at intermediate points using an FIR interpolation filter of the type illustrated in FIG. 2. The $W_1(t)$ weighting function in this example is seen to decline to zero in the vicinity of the focal point 74 of the deeper focused beam.

In correspondence with the change of the $W_1(t)$ weighting function, the $W_2(t)$ weighting function for the more deeply focused scanline has a zero value up to the focal point 72 of the shallower focused beam. Thereafter the weighting function increases with a (1−inverse) function 84 until attaining a normalized value of 1 at the focal point 74 of the more deeply focused beam. Thus, when the echoes from a shallow focused beam and a deeper focused beam are weighted with these functions and combined, the multizone focused beam is a function of only the shallow focused beam in the very near field (depths shallower than focal point 72), a function of only the more deeply focused beam in the most far field (beyond focal point 74), and a function of the two beams between the focal points of the beams, in relation to the relative focal quality of the two beams over these intermediate depths of field. Exemplary weighting functions for combining two scanlines focused at $R_1$ and $R_2$ are of the form $\omega(R_1)=1-\alpha$ and $\omega(R_2)=\alpha$, where $$\alpha = C_1 - C_2\left(\frac{1}{R}\right) = \left(\frac{1}{R_1} - \frac{1}{R}\right)\left(\frac{R_1 R_2}{R_2 - R_1}\right) = \left(\frac{R - R_1}{R}\right)\left(\frac{R_2}{R_2 - R_1}\right)$$

for regions where the paraxial approximation holds and the transmit apertures are of equal extent. When the transmit apertures do not have equal extent the weights may be chosen by an algorithm that optimizes some aspect of the synthesized transmit beam quality. It has been found that maximizing the mainlobe to sidelobe ratio with depth provides satisfactory results.

Figure 7:
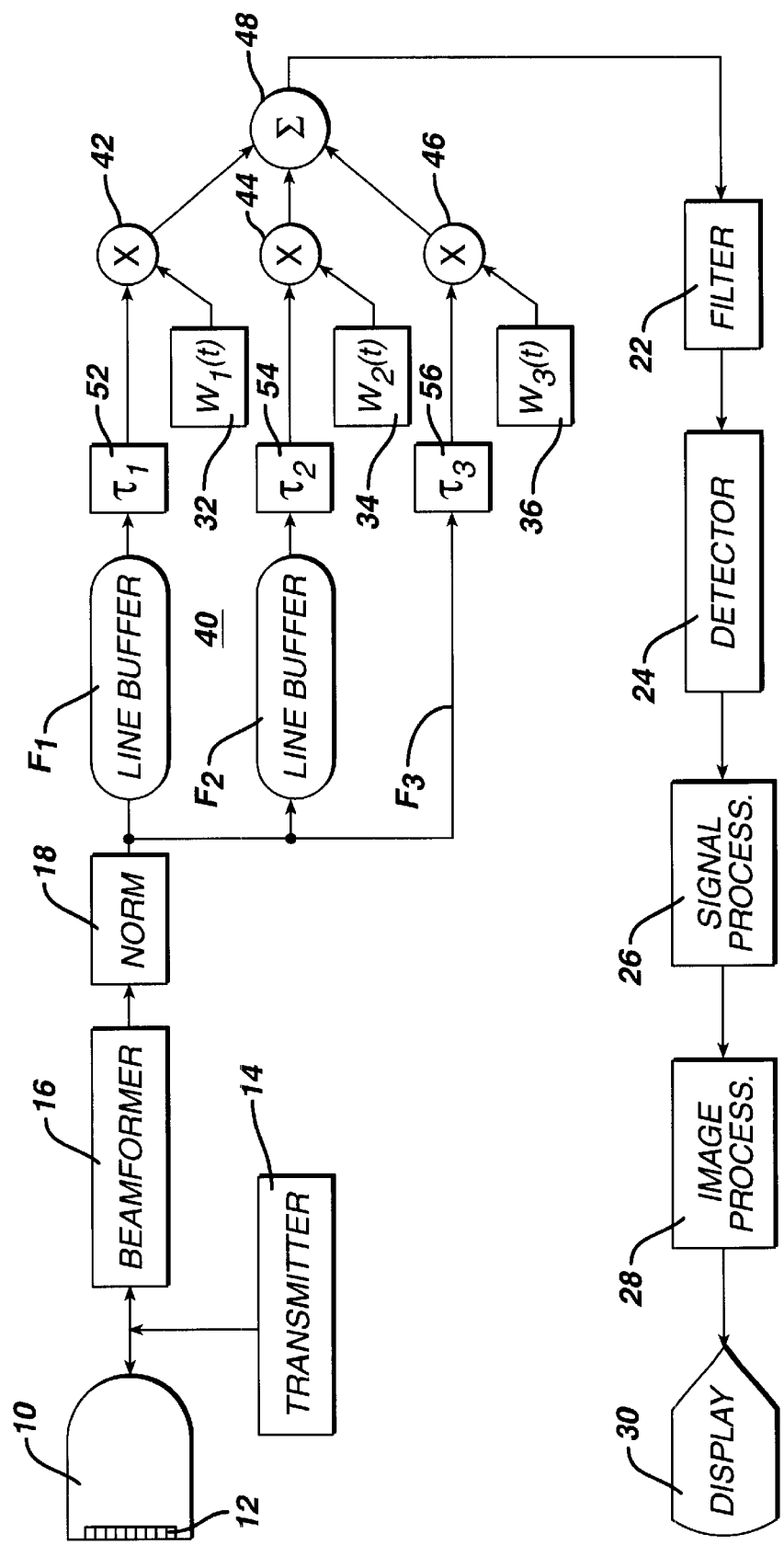
FIG. 7 illustrates in block diagram form a second embodiment of an ultrasonic diagnostic imaging system constructed in accordance with the principles of the present invention.

Referring to FIG. 7, a second embodiment of an ultrasonic diagnostic imaging system constructed in accordance with the principles of the present invention is shown. An array transducer 12 of a probe 10 is controlled by a transmitter 14 to transmit ultrasonic beams with different transmit focal characteristics into a body. The transmitter also steers the beams in desired beam directions. Echoes from within the body are produced in response to each transmitted beam and are received by the elements of the array transducer 12. The echoes are coupled to a beamformer 16 where they are appropriately delayed and combined to form coherent echo signals along each received scanline. In a conventional ultrasound system these scanline echo signals are filtered by a filter 22, detected by a detector 24 or Doppler processed by signal processor 26, then arranged into an image format by an image processor 28. The image signals are then displayed on a display 30.

In accordance with the principles of the present invention, an r.f. blending circuit 40 coherently blends the echo signals of a plurality of scanlines which exhibit different transmit focal depths. The r.f. blending circuit 40 can be implemented in the form of a digital filter, and is shown in the form of an FIR filter which, in the embodiment of FIG. 7, can resample, interpolate, and blend up to three scanlines at a time. In a typical operating scenario, a scanline location is scanned a number of times, each time with a different transmit focal point or range. The coherent echo signals produced by the beamformer 16 undergo normalization in a normalization circuit 18 to normalize the effects of different transmit apertures and transmit intensities for the different beams. The echo signals produced in response to the first and second differently focused transmit waves are stored in line buffers $F_1$ and $F_2$. The line buffers can comprise FIFO memories, for example. The echo signals from the third and (in this embodiment) last scan of the scanline location are coupled along path $F_3$. The scanline echo signals previously stored in line buffers $F_1$ and $F_2$ are now shifted out in synchronism with the echo signals of the last scanline and coherently combined. A third line buffer can be used in path $F_3$ if it is desired to temporarily store the last scanline prior to processing and combining with the echo signals of the other scanlines.

Prior to being combined the echo signals of the respective beams are locationally aligned by time variable delays 52, 54 and 56 and appropriately weighted by weighting circuits comprising multipliers 42, 44, and 46, to which time variable weighting functions $W_1(t)$, $W_2(t)$ and $W_3(t)$ are applied from coefficient stores 32, 34 and 36. The delayed and weighted r.f. echo signals from the multiple scans of the scanline are coherently combined by a summing circuit 48 to produce a composite scanline which synthesizes the effect of a dynamic transmit focus. The effect of the weighting circuits is to weight the relative contributions of the echo signals from the three beams to the composite scanline. Preferably this weighting is functionally related to the transmit aperture and the distances of each echo signal from its respective transmit focal point and the other focal points used in the combination process. The effect of the delays is to locationally align the r.f. echo signals being combined so that possible phase cancellation resulting from the combination of locationally mismatched signal data is reduced and preferably minimized. Preferably the delay characteristic is functionally related to the transducer transmit aperture and the distance of the echo signal from its transmit focal point. The result of this combining process is to produce a scanline with an extended range of focus.

The time delays 52–56 can be implemented in a variety of ways in consideration of the beamforming architecture used. In a preferred embodiment a time delay beamformer 16 is employed in which coherent beams are formed by time delaying and combining the signals received from the individual transducer element. With a time delay beamformer the time delays 52–56 can be implemented by a resampling filter or an interpolation filter which produces echo samples at the desired range locations. When a phase shift beamformer is used such as that described in U.S. Pat. No. 5,623,928 a phase aligner or phase rotator can be used to impart a phase adjustment to the beam samples with a complex multiplier as described in that patent. In either case the time delays or phase adjustment can be implemented at any point in the processing sequence prior to the summing circuit 48. Specifically, the delays or phase adjustments can be implemented on a per-channel basis in the beamformer 16. Likewise, the weighting function of the present invention can also be employed at any point prior to the summing circuit 48, including integration of the weighting coefficients with those of other filter functions.

A second aspect of the present invention which makes possible the foregoing improvement is that, unlike prior art techniques, the differently focused beams are being coherently combined rather than incoherently combined, i.e., combined before being nonlinearly processed, with care taken to synchronize the timing (clocks) of the transmit and receive circuitry. The arrangements shown in the prior art multi-zone patents show the cross-fading at the zone boundaries being performed on detected echo data, not r.f. echo data. The embodiment of FIG. 7 shows the r.f. blending circuit 40 located prior to the detector 24. The circuit 40 can accordingly be located at any point in the signal path where the signals being combined remain coherent. The circuit could be located either before or after baseband demodulation, for instance.

Figure 8A:
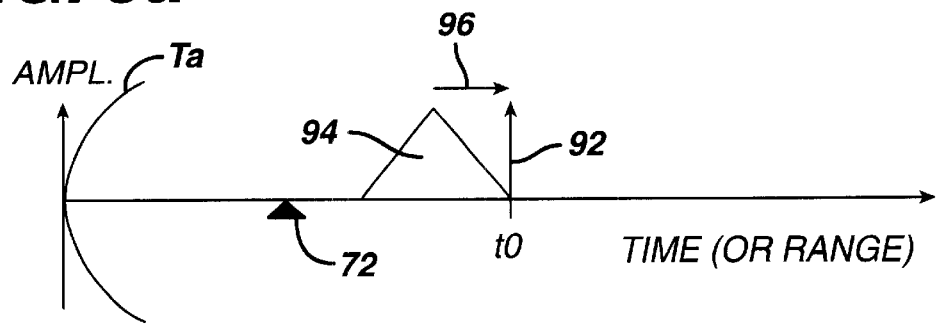

FIGS. 8a–9b illustrate the locational misregistration occurring at locations removed from a beam focal point. FIG. 8a shows a transducer aperture with an effective curvature focused at a focal point 72 along the abscissa of the drawing, which represent the time of travel or range (depth) from the transducer. The transmitted wave will exhibit an optimal impulse response at the focal point 72 where the beam is optimally focused. On either side of the focal point the impulse response will be locationally offset or displaced and less optimal (spread out). This is illustrated at point t0 where an optimal impulse response (represented by the arrow 92) is desired but the actual impulse response is locationally advanced and broadened as shown by the triangular response 94 due to the fact that the transmit aperture is out of focus (not optimally focused) at point t0. In order to compensate for this out-of-focus condition, the echoes returned from point t0 are delayed as indicated by arrow 96 to provide a locational adjustment of the received echo signals. The phase shift or time delay applied at points along the abscissa preferably corresponds to the degree of defocus, which is a function of the time or distance from the optimal focal point 72, as indicated by the delay compensation characteristic 98 in FIG. 8b. As the characteristic 98 shows, a compensating delay is used for points distal to (beyond) the transmit focal point 72.

Full compensation for the broadening would require the use of an inverse (preferably a Wiener) deconvolution filter rather than a delay. The intent of a delay or phase correction is to minimize the locational error or phase error at the center frequency of the transducer probe or signal.

Figure 8B:
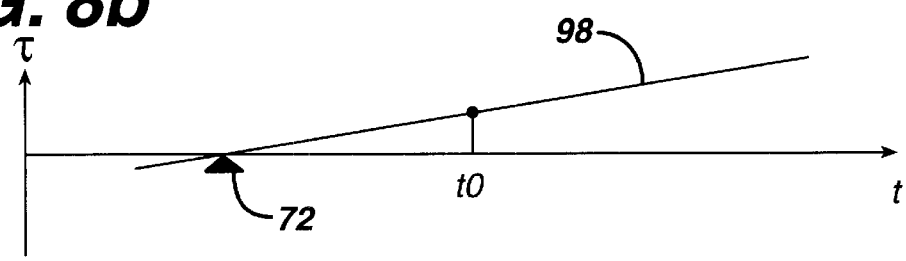
Figure 9A:
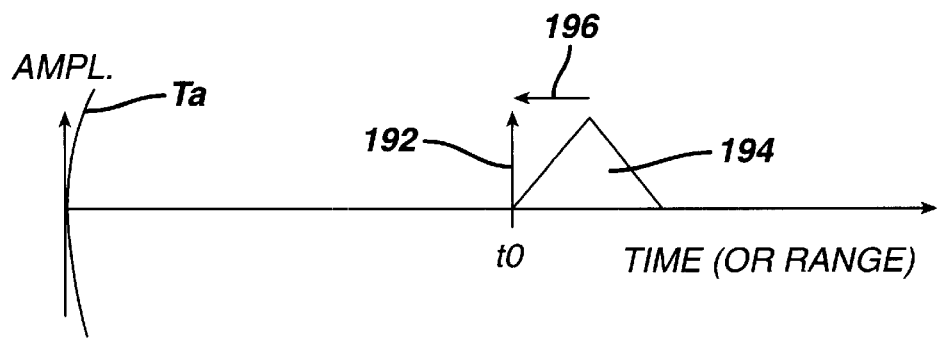

FIG. 9a shows the condition arising when the transducer aperture is focused at a more distant transmit focal point 74 and point t0 is proximal to (nearer to the aperture than) the focal point. In this case an advance or negative delay or phase alignment of opposite sense to that of FIGS. 8a and 8b, indicated by time advance arrow 196, is used to compensate for the delayed and broadened impulse response 194. It will be appreciated that "advance" is a relative term, and can be obtained by one signal being delayed to a lesser extent than another. Delay compensation characteristic 198 in FIG. 9b is seen to be below the abscissa in the drawing, showing that a time delay or phase alignment of opposite sense to that of FIG. 8b is required for echo signals at point t0 when the point t0 is proximal to the transmit focal point.

The illustration of the delays and impulse response spreading of FIGS. 8a–9b are exaggerated for purposes of illustration. In practice it has been found that these delays are usually quite small, often on the order of less than a period of the echo signal center frequency. Excessive delays would be indicative of spatial undersampling of the transmit foci for purposes of combining.

Figure 9B:
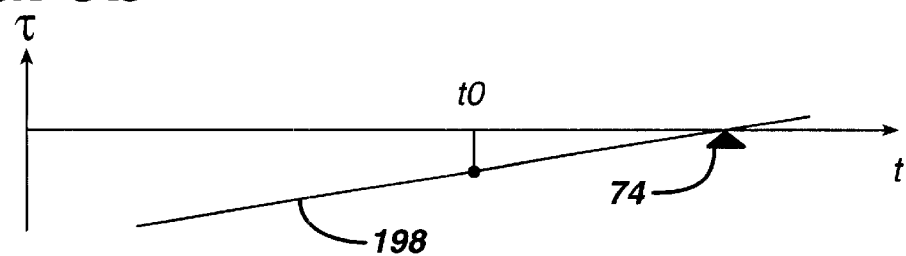

FIGS. 8b and 9b illustrate the use of linear delay or phase compensation characteristics for the echo signals from the differently focused scanlines which are to be combined to form an extended focus scanline. While linearly varying compensation is suitable for implementation of the present invention, a preferred delay characteristic is the nonlinear characteristic 140 shown in FIG. 10. This delay characteristic is produced by the expression $$\Delta = \Delta_f - (\sqrt{R^2 + a^2} - R)$$

where $\Delta$ is the value of the delay compensation at range R, a is the effective off-axis dimension of the transmit aperture, and the delay at the transmit focal point $\Delta_f$ is $$\Delta_f = \sqrt{R_f^2 + a^2} - R_f$$

where $R_f$ is the range at which the transmit aperture is focused. The term a is the effective aperture in the sense that it provides the group delay resulting from the aggregate contributions to the delay of all elements in the transmit aperture.

An embodiment of the present invention can be employed which does not utilize time delay or phase compensation. Alternatively, fixed delays can be used, in which case there is a progressive axial spatial distortion between focal points which may be compensated for during scan conversion, if desired. Preferably, dynamic delay compensation is used. The use of delay compensation has been found to improve axial resolution and to increase on-axis response while reducing undesired cancellation resulting from the combining of locationally misaligned signals of the scanlines being combined. The improved on-axis response also results in lateral resolution improvement. Even a fixed delay (as opposed to the preferred dynamic delay) can provide improvement at points along the combined echo scanline.

It will be appreciated that the relative delays described by FIGS. 8a–10 are illustrated by delays $\tau_1-\tau_3$ in the embodiment of FIG. 7. The relative delays can be implemented in a variety of ways. When FIFO registers are used for the line buffers the delays can be implemented by the relative timing of the clock signals for the registers. If a memory device or devices are used for the line buffers the delays can be implemented by the timing of memory data access. In a particular embodiment these techniques for delay implementation may result in a time delay adjustment which is more coarse than desired. Time varying (dynamic) delays with resolution finer than a sample period of the beamformer output are realized by using an FIR interpolation filter with time varying coefficients. Such a filter has been found to work well if the delay change is updated frequently, on the order of 1/32 of a wavelength or better.

The delays are implemented in the embodiment of FIG. 7 as group delays applied to beamformed signals. It will be appreciated that if a programmable beamformer is used, the delays can also be implemented in the beamformer. Since the beamformer channels utilize delays for beam formation, the delays of the present invention can be implemented in the beamformer as adjustments to beamformer delay or phase shift values.

It should be noted that in the prior art, the butt-fitting of adjacent scanline segments is done with no combining of signals of the adjoining segments, and the cross-fading techniques shown in the cited patents only cross-fade two adjoining scanline segments at the zone boundaries where the segments overlap. A preferred embodiment of the present invention, as discussed above, combines scanline segments which spatially overlap for an appreciable range, generally at least half the distance between focal points and preferably for the full distance between focal points as illustrated in FIGS. 5, 6a and 6b. Furthermore, when more than two transmit beams are used, more than two overlapping beams can be combined at specific depths of field. The embodiment of FIG. 7, for example, is an embodiment for combining three overlapping, differently focused scanlines. Each received scanline can extend for the full depth of the final extended focus scanline, and at different points along the scanline signals from one, two or even three beams are combined with weighting and/or phase adjustment to form the composite extended focus scanline. The number of individual beams which are combined at any point along the extended focus scanline is a function of the relative contributions from the received echo signals at each point along the scanline, and can be implemented by choice of desired weighting functions. A weighting function which uses negative weights for some of the signals at times can be used, and may be particularly useful when more than two scanlines are being combined at a time. For instance, only the focused beam can be used at the individual focal points, with contributions from other beams being added (or subtracted) on either side of the focal points. Alternatively, multiple beams can contribute to the extended focus scanline at one or more of the individual focal points in addition to locations between focal points. The resulting effect is as if the extended focus scanline were transmitted with a dynamic transmit focus. The r.f. extended focus scanline is then detected or further processed for display.

FIGS. 11a and 11b illustrate use of the principles of the present invention with a scanline that has a single transmit focus to improve diagnostic accuracy. In FIG. 11a a transducer array 12 transmits a beam 122 which intersects an object 120. The beam 122 is focused around the center of the object 120 as indicated by the focus marker 52. This means that the center of the object 120 will be in focus, but the near boundary of the object at point $P_1$ and the far boundary of the object at point $P_2$ will not be optimally focused. This is demonstrated by FIG. 11b, which shows a sharp impulse response 130 of the transducer aperture Ta at the focal point 52, but broadened and displaced responses 132 and 134 at points $P_1$ and $P_2$. If the user desires to measure the dimension of the object 120 through which the scanline 122 is passing, an unnecessary ambiguity is created by the locational error of the out-of-focus condition at points $P_1$ and $P_2$. In accordance with a further aspect of the present invention, the echo data at points $P_1$ and $P_2$ can be made more accurate by adjustment of the spatial registration of echo data through the application of spatially varying time delays. An advancing (relatively negative) delay is applied to the echo data at the point $P_1$ proximal to the focal point 52, and a greater (relatively positive) delay is applied to the echo data at the distal point $P_2$. These adjustments improve the spatial registration and hence the accuracy of each of these points from which measurements are to be made. The accuracy in a given case can be improved by sub-millimeter precision.

FIG. 12 illustrates an embodiment of the present invention whereby high frame rates can be obtained through the principles of multiline reception combined with both beam steering and beam focus interpolation. This drawing spatially depicts scanline locations in an ultrasonic image field. A first beam $T_{S1}$ is transmitted as shown with a relatively short (near to the transducer) focus. Two scanlines $R_{S1}$ and $R_{S2}$ are received on either side of the transmit beam center, each with a relatively short transmit focal point $f_S$. A second beam $T_{L1}$ is transmitted as shown with a relatively long (farther from the transducer) focus, and two scanlines $R_{L1}$ and $R_{L2}$, each with a relatively deeper focal point $f_L$ are received on either side of the center of the second beam $T_{L1}$. Transmission and reception continues in this manner, with a third transmit beam $T_{S2}$ resulting in multilines $R_{S3}$ and $R_{S4}$ and a fourth transmit beam $T_{L2}$ resulting in multilines $R_{L3}$ and $R_{L4}$ (not shown). As the second row of FIG. 12 shows, the result is a laterally interleaved sequence of scanlines of different focal points.

From this sequence of differently steered and focused scanlines, image scanlines with multiple or extended focal ranges are produced, as shown at the bottom of FIG. 12. An image scanline $SL_1$ at a laterally intermediate position with properties of both focal points $f_S$ and $f_L$ is formed by weighting (and, if desired, time delaying or phase shifting) and coherently combining laterally distinct scanlines $R_{S1}$ and $R_{L1}$. Similarly, a laterally intermediate image scanline $SL_2$ with properties of both focal points $f_S$ and $f_L$ is formed by weighting (and, if desired, time delaying or phase shifting) and coherently combining laterally distinct scanlines $R_{L1}$ and $R_{S2}$. Image scanlines $SL_3$–$SL_6$ are formed in a similar manner.

An image formed by the scanning technique of FIG. 12 can exhibit spatial misregistration artifacts due to the round trip aperture variation from one scanline to another. The artifact can manifest itself as a curvature or slanting of the scanline data from its desired location in the image field. This artifact can be reduced by re-registering the received scanline data with a resampling filter prior to combining the differently focused receive scanlines to form the image scanlines. A suitable resampling filter is one which laterally filters a plurality of receive scanlines of each type (short or long focus) to produce scanline data re-registered to the locations of the image scanlines. Effectively the received scanline data is laterally interpolated to the desired round trip locations. For instance, a lateral filter can weight and sum contributions from short focus receive scanlines $R_{S1}$, $R_{S2}$, $R_{S3}$, and so forth to produce re-registered short focus scanlines at the locations of image scanlines $SL_1$, $SL_2$, $SL_3$, and so forth. Because the misregistration error is a function of depth the weights used by the resampling filter typically vary with depth. Similarly, a lateral filter can weight and sum contributions from long focus receive scanlines $R_{L1}$, $R_{L2}$, $R_{L3}$, and so forth to produce re-registered long focus scanlines at the locations of image scanlines $SL_1$, $SL_2$, $SL_3$, and so forth. The re-registered scanline data can then be combined at each image scanline location to produce image scanlines $SL_1$, $SL_2$, $SL_3$, and so forth. The receive scanline data can be weighted in the re-registration filtering process so that it does not have to be weighted a second time before being combined to form extended focus image scanlines.

In a second embodiment of both beam steering and focus interpolation shown in FIG. 13 the received beams from differently focused transmit beams can be steered to be in lateral alignment, with extended focus scanlines produced at the common location at which the differently focused beams are aligned. A transmit beam $T_{S1}$ with a short focus is transmitted and in response short focus multilines $R_{S1}$ and $R_{S2}$ are simultaneously received on either side of the transmit beam. A transmit beam $T_{L1}$ with a long (greater depth) focus is transmitted and in response long focus multilines $R_{L1}$ and $RL_2$ are received on either side of the transmit beam. The received scanlines $R_{S2}$ and $R_{L1}$ are weighted and coherently combined to form an image scanline SL1. While the received scanlines $R_{S2}$ and $R_{L1}$ appear in the drawing to be slightly laterally offset, which is acceptable, it is preferred that the received scanlines being combined are laterally aligned. In a similar manner received scanlines $R_{L2}$ and $R_{S3}$ are weighted and coherently combined to form image scanline SL2. Transmission, reception, weighting and coherent combination continues in this manner across the image field.

Images formed by the scanning technique of FIG. 13 can also exhibit spatial misregistration artifacts. These misregistration artifacts, which will also manifest themselves as a curvature or slanting of the receive scanlines from their desired locations, can be corrected by resampling with the use of a lateral filter as described above in regard to FIG. 12. The misregistration can also be corrected by oversteering the receive scanlines in the beamformer. The misregistration can be precomputed and the steering delays of the beamformer adjusted to compensate for the misregistration by dynamically steering the received beams so that the round-trip beams are at their desired locations. Since the misregistration is a function of the different transmit foci of the receive scanlines, the oversteering will be a function of the transmit focus of each receive scanline. The corrected receive scanline data is then weighted and combined to form extended focus image scanlines at the desired locations.

The scanning sequences of FIGS. 12 and 13 can be performed with the embodiments of FIG. 2 or FIG. 7 in which a multiline beamformer is used. Portions of an ultrasound system with a multiline beamformer 216 with misregistration correction are shown in FIGS. 16 and 17. The multiline beamformer 216 produces multiple, spatially distinct receive beams in response to a single transmit beam as these drawings illustrate. In the embodiment of FIG. 16 the simultaneously received scanlines are stored in a line buffer 232, then applied to a resampling filter 234. The resampling filter produces receive scanlines at the desired locations by weighting the scanline data with dynamic (depth variable) weights 236 and laterally combining the weighted data. The spatially reoriented receive scanlines are applied to the RF blending circuit 240 which operates in the manner of circuit 40 described above to weight the differently focused receive scanlines with weights 242 and then combines the weighted data to produce extended focus image scanlines. It will be apparent that when the resampling filter and RF blending circuit are both embodied as filters, many if not all of their functionality can be implemented in a single filter operating on multiple laterally spaced and differently transmit focused receive scanlines.

FIG. 17 describes an ultrasound system which uses oversteering as described above by using delays in each channel of the multiline beamformer 216 to correct for the misregistration of the receive scanlines. The oversteering and focus delays 218 are stored and applied to the beamformer 216 for oversteering and focusing. The multiple receive beams are stored in the line buffer 232, then applied to the RF blending circuit to produce extended focus image scanlines.

In both of these embodiments it is preferred that the weights 242 are a function of the focal characteristics of the transmit beams such as those shown in FIGS. 6a and 6b. While linearly varying weighting functions can be employed, in a preferred embodiment the weighting functions are nonlinear as discussed above, and time varying. Time varying delay functions similar to those described above can also be employed, and either time delays or phase aligning can be used, either of which can be linearly or nonlinearly time varying. Image scanlines with multiple or extended focal characteristics are thus synthesized across the image field at intermediate scanline positions, then Doppler or amplitude detected and displayed.

The misregistration artifact which arises in multiline scanning is a line registration artifact caused by the differing transmit and receive apertures and the use of fixed transmit focusing with dynamic receive focusing. The roundtrip scanlines become slightly spatially misregistered in a slanted or bowed manner as illustrated in FIG. 14a, with the shape of the "bow" being a function of the transmit focus location and the strength or sharpness of transmit focusing. In this example successive aligned short focus transmit beam $T_{S1}$ and long focus transmit beam $T_{L1}$ are transmitted with each beam resulting in multiline received scanlines, $R_{S1}$ and $R_{S2}$ in response to transmit beam $T_{S1}$ and $R_{L1}$ and $R_{L2}$ in response to transmit beam $T_{L1}$. The coherent combining of the received scanline pairs will result in an interpolated scanline which is spatially misregistered in the same manner as the received scanlines being interpolated.

The symmetrically bowed misregistration shown in FIG. 14a would be the case for identically focused transmit beams. But when the transmit beams are differently focused for extended focus synthesis, the bowing becomes asymmetrical as shown in exaggerated form in FIG. 14b, as the misregistration is drawn to the respective focal points. A degree of this misregistration can be eliminated by careful selection of the transmit-receive aperture pairs being combined, as shown in FIG. 15a. This drawing illustrates the misregistration due to the aperture differences of the embodiment of FIG. 13 in which received scanline $R_{S2}$ from transmit beam $T_{S1}$ is to be combined with received scanline $R_{L1}$ from transmit beam $T_{L1}$. As the drawing shows, the misregistration due to the steering differences is opposite and laterally aligned and will cancel when the two received scanlines are coherently combined.

The coherent combination of received scanlines $R_{S2}$ and $R_{L1}$ of FIG. 15b, while canceling the steering (aperture) related misregistration shown in FIG. 15a, will not cancel the focal misregistration, as these artifacts are not symmetrically aligned due to the axial differences of the focal points. Some residual misregistration "wiggle" will remain in the interpolated extended focus scanline formed by combining scanlines $R_{S2}$ and $R_{L1}$. The component of the misregistration artifact due to the focal differences of the two beams can preferably be removed by oversteering each received beam as a function of its transmit focal point as it is received, or re-registering (resampling) the received beams prior to combining as described above.

It is seen from FIGS. 12–17 that the image frame rate will be relatively high due to the use of multiline reception, in which multiple scanlines are received in response to a singe transmit beam. The acquisition strategy illustrated in FIG. 13 results in one extended focus line for every transmit event, and that of FIG. 12 results in two extended focus lines for every transmit event. This is a factor of two and four better than a non-multiline acquisition scheme which requires two transmit beams to synthesize one extended focus line. It will be appreciated that lateral filtering of more than two received scanlines to form an extended focus line may also be employed consistent with the present invention. Alternatively, high frame rate can be traded off for higher scanline density. Furthermore, since the image scanlines are consistently synthesized from scanline data received from different transmit beams, interpolation artifacts are reduced. It will be appreciated that this technique works with multiline reception greater than the 2:1 ratio shown in this example, and that lateral interpolation can be done with a filter operating on more than two received scanlines at a time. Other configurations, where beam steering and beam focus interpolation are combined without multiline operation are also within the scope of the present invention.

A further advantage of the present invention is an ease of what is known as scanhead integration. In scanhead integration a transducer probe is matched to operate with an ultrasound system. Optimal imaging performance is obtained by utilizing beamforming and signal processing which is best matched to the performance of the transducer array. One performance characteristic which requires careful attention is the uniformity of a multi-zone image. Because the separate scanline segments of a multizone image are often acquired with different gain and or aperture control, the multi-zone image can appear to have seams where the individual segments are joined together. An embodiment of the present invention which combines beam segments over a substantial distance between focal points or combines more than two beams will markedly reduce the seam problem, thereby reducing the need for special adjustment at the zone boundary locations. Gain adjustments are only required to broadly equalize the gains of the various zones, which is a much simpler task.

What is claimed is:

1. A method for producing an ultrasonic scanline comprising the steps of:

transmitting a first transmit beam having a first transmit characteristic;

receiving a first sequence of echoes at a first receive beam location in response to said first transmit beam;

transmitting a second transmit beam having a second transmit characteristic;

receiving a second sequence of echoes at a second receive beam location in response to said second transmit beam;

relatively weighting echoes of said first and second sequences; and coherently combining relatively weighted echoes of said first and second sequences to form a scanline at a location intermediate said first and second receive beam locations having characteristics of both of said first and second transmit beams.

2. The method of claim 1, wherein said first transmit characteristic is a first transmit focus and wherein said second transmit characteristic is a second transmit focus.

3. The method of claim 1 or 2, wherein said step of relatively weighting comprises utilizing a linearly varying weighting function as a function of depth.

4. The method of claim 1 or 2, wherein said step of relatively weighting comprises utilizing a nonlinearly varying weighting function as a function of depth.

5. The method of claim 1 or 2, further comprising the step of relatively time delaying or phase shifting echoes of said first and second sequences prior to said step of coherently combining.

6. The method of claim 5, wherein said step of relatively time delaying or phase shifting comprises utilizing a linearly varying time delay or phase shift function as a function of depth.

7. The method of claim 5, wherein said step of relatively time delaying or phase shifting comprises utilizing a nonlinearly varying time delay or phase shift function as a function of depth.

8. The method of claim 5, wherein said step of relatively time delaying or phase shifting comprises applying a group delay or phase shift to said echoes of a sequence.

9. A method for producing an ultrasonic scanline comprising the steps of:

transmitting a first transmit beam having a first transmit characteristic in a first steering direction;

receiving a first sequence of echoes in response to said first transmit beam;

transmitting a second transmit beam having a second transmit characteristic in a second steering direction;

receiving a second sequence of echoes in response to said second transmit beam;

relatively weighting echoes of said first and second sequences; and coherently combining relatively weighted echoes of said first and second sequences to form a scanline having characteristics of both of said first and second transmit beams.

10. The method of claim 9, wherein said first transmit characteristic is a first transmit focus and wherein said second transmit characteristic is a second transmit focus.

11. The method of claim 9 or 10, wherein said step of relatively weighting comprises utilizing a linearly varying weighting function as a function of depth.

12. The method of claim 9 or 10, wherein said step of relatively weighting comprises utilizing a nonlinearly varying weighting function as a function of depth.

13. The method of claim 9 or 10, further comprising the step of relatively time delaying or phase shifting echoes of said first and second sequences prior to said step of coherently combining.

14. The method of claim 13, wherein said step of relatively time delaying or phase shifting comprises utilizing a linearly varying time delay or phase shift function as a function of depth.

15. The method of claim 13, wherein said step of relatively time delaying or phase shifting comprises utilizing a nonlinearly varying time delay or phase shift function as a function of depth.

16. The method of claim 13, wherein said step of relatively time delaying or phase shifting comprises applying a group delay or phase shift to said echoes of a sequence.

17. A method for producing an ultrasonic scanline comprising the steps of:

transmitting and receiving a first beam having a first focus and a first steering characteristic;

transmitting and receiving a second beam having a second focus and a second steering characteristic;

weighting at least one of said first and second received beams as a function of depth; and coherently interpolating the focus and steering characteristics of said first and second beams.

18. The method of claim 17, further comprising the step of time delaying at least one of said first and second received beams as a function of depth.

19. The method of claim 17, further comprising the step of phase aligning at least one of said first and second received beams as a function of depth.

20. An ultrasonic diagnostic imaging system comprising:

an array transducer which transmits and receives beams of different beam steering characteristics and at least one other differing transmit characteristic;

a beamformer coupled to said array transducer which produces sequences of echo signals in response to the reception receive beams of differing transmit characteristics;

a weighting circuit which weights at least one of said sequences of echo signals; and a combining circuit, coupled to said beamformer, which coherently combines echo signals of said first and second sequences, whereby a scanline having the properties of said differing transmit characteristic of both beams is provided.

21. The ultrasonic diagnostic imaging system of claim 20, further comprising a transmitter, coupled to said array transducer, which controls said array transducer to transmit beams of different transmit foci, whereby a scanline having the properties of said different transmit foci is provided.

22. The ultrasonic diagnostic imaging system of claim 20 or 21, wherein said beamformer comprises a multiline beamformer receiving multiple beams in response to a single transmit event.

23. The ultrasonic diagnostic imaging system of claim 22, wherein said receive beams result from at least one of differing transmit beam steering and differing receive beam steering.

24. The ultrasonic diagnostic imaging system of claim 22, wherein said weighting circuit weights at least one of said sequences of echo signals linearly as a function of depth.

25. The ultrasonic diagnostic imaging system of claim 22, wherein said weighting circuit weights at least one of said sequences of echo signals nonlinearly as a function of depth.

26. The ultrasonic diagnostic imaging system of claim 20 or 21, further comprising a time delay circuit coupled prior to the combining circuit.

27. The ultrasonic diagnostic imaging system of claim 26, wherein said beamformer comprises a time delay beamformer.

28. The ultrasonic diagnostic imaging system of claim 20 or 21, further comprising a phase aligner coupled prior to the combining circuit.

29. The ultrasonic diagnostic imaging system of claim 28, wherein said beamformer comprises a phase shift beamformer.

30. The ultrasonic diagnostic imaging system of claim 20 or 21, further comprising a normalization circuit having an input coupled to said beamformer and an output coupled to said combining circuit.

31. The ultrasonic diagnostic imaging system of claim 20 or 21, further comprising a misregistration correction processor for spatially aligning said receive beams prior to combining.

32. The ultrasonic diagnostic imaging system of claim 31, wherein said misregistration correction processor comprises the receive beam steering circuitry of said beamformer.

33. The ultrasonic diagnostic imaging system of claim 31, wherein said misregistration correction processor corrects spatial misregistration resulting from the focal differences of two or more receive beams.

34. The ultrasonic diagnostic imaging system of claim 20 or 21, further comprising a detector having an input coupled to receive signals from said combining circuit and an output; and a display having an input coupled to the output of said detector.

35. A method for producing an ultrasonic scanline comprising the steps of:

transmitting a first beam having a first focus and receiving at least two receive scanlines in response thereto;

transmitting a second beam having a second focus and receiving at least two receive scanlines in response thereto; and weighting and coherently combining scanlines received in response to said first and second beams to produce extended focus scanlines.

36. The method of claim 35, wherein said first and second beams exhibit substantially the same transmit steering.

37. The method of claim 36, further comprising the step of correcting misregistration of the received scanlines prior to the step of weighting and coherently combining.

38. The method of claim 37, wherein said step of correcting misregistration comprises the step of dynamically oversteering said receive scanlines.

39. The method of claim 38, wherein said step of dynamically oversteering operates as a function of the focus of the transmit beam.

40. The method of claim 37, wherein said step of correcting misregistration comprises the step of resampling received scanline data.

41. The method of claim 40, wherein said step of resampling comprises laterally filtering received scanline data.

42. The method of claim 35, wherein said first and second beams exhibit substantially the same receive steering.

43. The method of claim 42, further comprising the step of correcting misregistration of the received scanlines prior to the step of weighting and coherently combining.

44. The method of claim 43, wherein said step of correcting misregistration comprises the step of dynamically oversteering said receive scanlines.

45. The method of claim 44, wherein said step of dynamically oversteering operates as a function of the focus of the transmit beam.

46. The method of claim 43, wherein said step of correcting misregistration comprises the step of resampling received scanline data.

47. The method of claim 46, wherein said step of resampling comprises laterally filtering received scanline data.

* * * * *